Oct. 21, 1924.  
A. H. TINNERMAN  
SPRING NUT  
Filed Jan. 19, 1923  
1,512,653

INVENTOR  
Albert H. Tinnerman  
By Bates & Machlin  
ATTYS.

Patented Oct. 21, 1924.

1,512,653

UNITED STATES PATENT OFFICE.

ALBERT H. TINNERMAN, OF CLEVELAND, OHIO.

SPRING NUT.

Application filed January 19, 1923. Serial No. 613,628.

*To all whom it may concern:*

Be it known that I, ALBERT H. TINNERMAN, a citizen of the United States, residing at Cleveland, in the county of Cuyahoga and State of Ohio, have invented a certain new and useful Improvement in Spring Nuts, of which the following is a full, clear, and exact description, reference being had to the accompanying drawings.

This invention is to provide a spring nut which may be conveniently positioned on its bolt and which may be tightened by pressure upon the nut itself, or by a turning of the bolt. Further specific objects are to make a spring nut of this character which shall be capable of being cheaply manufactured from inexpensive material, and from stamping operations, and without the necessity of threading or tapping operations.

Additional objects include so making and arranging the nut that it may be used close to shoulders on narrow flanges, and the like, and may allow convenient assembling where inaccessibility offers difficulty to the use of standard or usual threaded nuts. For example in the manufacture of stoves, there are many of the parts, particularly sheet metal plates which need to be held firmly together, and where it is desirable that the action of the nut and bolt should be yielding to prevent the vibration or relative movement of the parts loosening the nut, and at the same time which parts do not need to be held against any great strain. My invention particularly fulfills such a need, and is particularly useful where such stove plates are enameled and which are likely to be defaced by too tight clamping of rigid nut and bolts. Because it accomplishes this purpose it may properly be termed a "cushion nut".

A preferred embodiment of my invention is shown in the accompanying drawings to which the following description relates, and the essential features are summarized in the claims.

Figure 1:
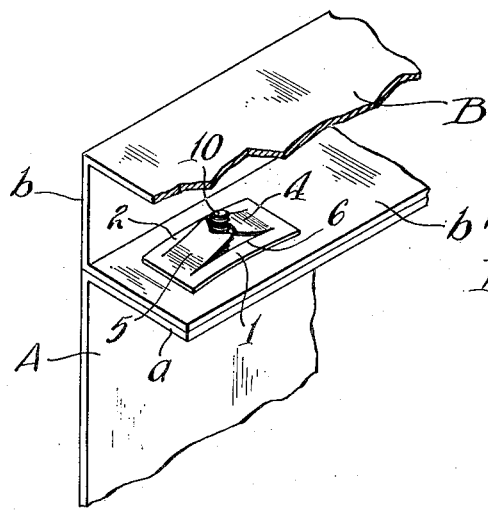
Figure 5:
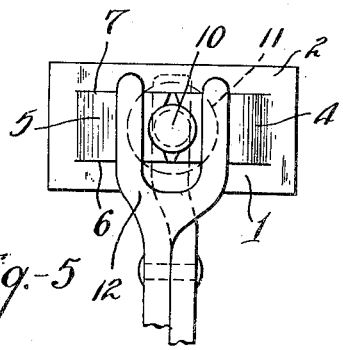
Figure 2:
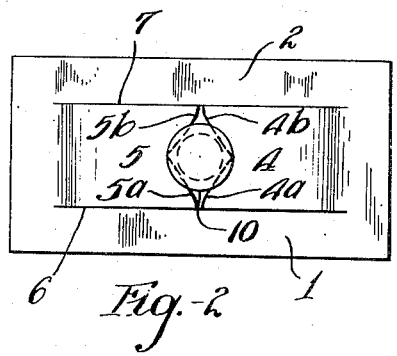
Figure 3:
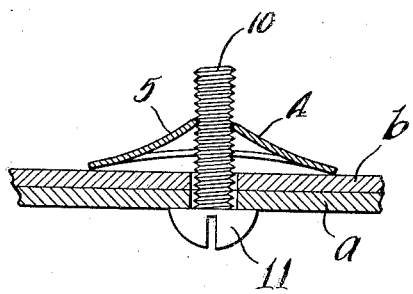
Figure 4:
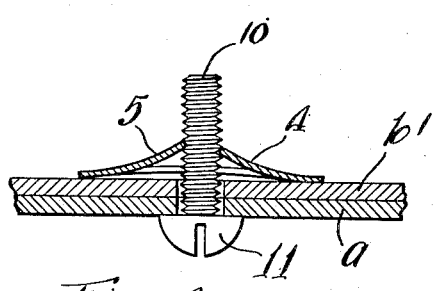

In the drawings, Fig. 1 is a perspective view of my lock nut shown as associated with parts of the stove plates in a comparatively inaccessible position, the parts being broken away to show the nut; Fig. 2 is a plan of the nut on an enlarged scale; Fig. 3 is a vertical section somewhat less enlarged showing the nut positioned upon the bolt but before tightening; Fig. 4 is a similar view showing the nut in its tightened position; Fig. 5 illustrates a method of tightening the nut, being a plane showing the application to the nut of a special pair of pincers.

Referring to the drawings by reference numerals, the particular form of nut embodying my invention comprises a base portion of longitudinal side members 1 and 2, integrally joined at the ends, with intervening tongues 4 and 5 normally extending upwardly from the side portions 1 and 2, and having their adjacent ends arranged to engage the threads. The nut is preferably formed from a rectangular blank of sheet metal having suitable yielding or spring-like characteristics. The two tongues 4 and 5 may be struck up upwardly by a die, severing them along the edges 6 and 7 of the side members 1 and 2 respectively. These tongues are curved upwardly substantially as shown in Fig. 3. At the same time the side members 1 and 2, that is the entire base, is curved materially, as shown particularly in Fig. 3, to allow certain longitudinal extension taking place when clamping the nut tightly in position and to provide a constant yielding upward pressure on the side of the tongue when the nut is in locked or set position.

The inner ends of the tongue are so formed that each tongue has a wide V-shaped end engaging the threads. The apex of the angle between the edges $4^a$ and $4^b$ and $5^a$ and $5^b$, Fig. 2, is substantially midway between the two sides of the tongues, respectively.

If the metal of which the nut is formed be thin enough to allow its edges to engage between the threads, no further treatment need be given them, otherwise during the punching and stamping operation, these edges $4^a$ and $4^b$ and $5^a$ and $5^b$ are beveled or sharpened to closely fit into the threads of the bolt. It will be noted that this angular arrangement of the edges provides approximately a diamond shape opening embracing the bolt. This causes engagement with the threads at four points, although only two tongues are used. Thus the edges $4^a$ and $4^b$ of one tongue may engage in separate thread grooves, or in the same thread groove, while the opposite edges engage in other thread grooves, thus without material distortion of the tongue the very effective grip of the bolt is secured, whereas if these edges were merely curved to substantially the curvature of the exterior of the threads, such effective engagement is apt to be prevented by the curved edge riding upon the top of the thread.

In assembling the nut upon the bolt to hold the parts together, the nut is simply placed over the bolt and pressed along the same or the bolt thrust the same. For example, assuming the stove plates A and B meeting at right angles, by flanges $b$ and $b^1$ and the flange $a$, and are to be held by a usual stove bolt indicated at 10, the bolt is thrust through the opening while holding the nut in position and thereafter the firm clamping may be effected either by turning the bolt with a screwdriver applied to the usual slotted head 11. The tongues may be brought downwardly along the threads to effect a tight engagement, by the use of pincers or pliers gripping beneath the plate $a^1$ and engaging the tongues 4 and 5 successively. In case is is desired to apply a large number of these nuts with pliers, special arrangement may be made to use a plier engaging both the tongues at once, as shown in Fig. 5. Such pliers may have a bifurcated jaw 12 engaging both tongues and an opposed jaw to engage the head of the bolt.

As the tightening occurs, the tongues 4 and 5 tending to flatten out, exert considerable pressure longitudinally of the base of the nut, thus flattening the arched portions 1 and 2 substantially into contact with the surface against a tendency to draw upwardly on each of these tongues. Furthermore, it will be noted that as the tongues are brought downwardly into close engagement they are braced on opposite sides, or in other words, effectively strengthened by the engagement of the sides thereof with the inner edges 6 and 7 of the sides 1 and 2. The oblong character of the nut makes for convenience in assembling close to shoulders, such as formed by the flange $b$ of the plate B, for example, and at the same time prevents any tendency of the nut to loosen by turning on the bolt.

From the foregoing description, it will be seen that I have provided a spring nut adapted to be very cheaply manufactured by stamping processes from sheet metal blanks, and capable of convenient application to inaccessible places, and which very firmly grips the bolt. It will be noted particularly, that I have provided a nut which has no tendency to loosen because of the arched base portion which is flattened by the pressure of the tightening action resulting in a constant inward pull on each of the members engaging the threads of the bolt. Furthermore, I have secured the advantages of great rigidity by rectangular characters of the base and the bracing effect of the tongues fitting closely into the opening from which they are struck, and in addition to that, have secured an effective engagement with the threads while using only two spring members or tongues by causing engagement for a material portion of the circumference of the threads and yet at separated points on each tongue. This prevents the top of any thread from holding one of the tongues out of firm engagement. In this connection, it may be noted that a single thread engaged, for example, by the edges $4^a$ and $4^b$ may pass from below the tongue to above the tongue between these edges, while at either side of the apex of the angle formed by these edges, the thread will be engaged substantially its full depth.

Having thus described my invention, what I claim is:

1. A nut adaptable for use in connection with threaded bolts comprising an arch-shaped metal stamping of rectangular form having a base portion and two opposed thread engaging spring tongues arched upwardly with relation to the base, the arch of the tongues being opposite to the arch of the base portion of the stamping and the longitudinal edges of the tongues being adapted to fit closely with the longitudinal edges of the stamped opening from which they are upset, the tongue portions of the nut being adapted to remain arched upwardly when the base portion thereof is substantially flattened as the tongues are brought into firm engagement with the threads of a bolt.

2. A nut adapatable for use with threaded bolts comprising a rectangular metallic stamping having a pair of opposed spring tongues, each tongue being upset from an arched base portion and formed to extend longitudinally substantially one half the length of the base, the tongues being arched to have the top surfaces thereof concave whereby the thread engaging edges of the tongues may be readily snapped over the threads of a bolt.

In testimony whereof, I hereunto affix my signature.

ALBERT H. TINNERMAN.